March 8, 1960     C. J. SCRANTON ET AL     2,927,694
ROTARY SEPARATOR FOR HARVESTER THRESHERS
Filed May 31, 1957     5 Sheets-Sheet 1
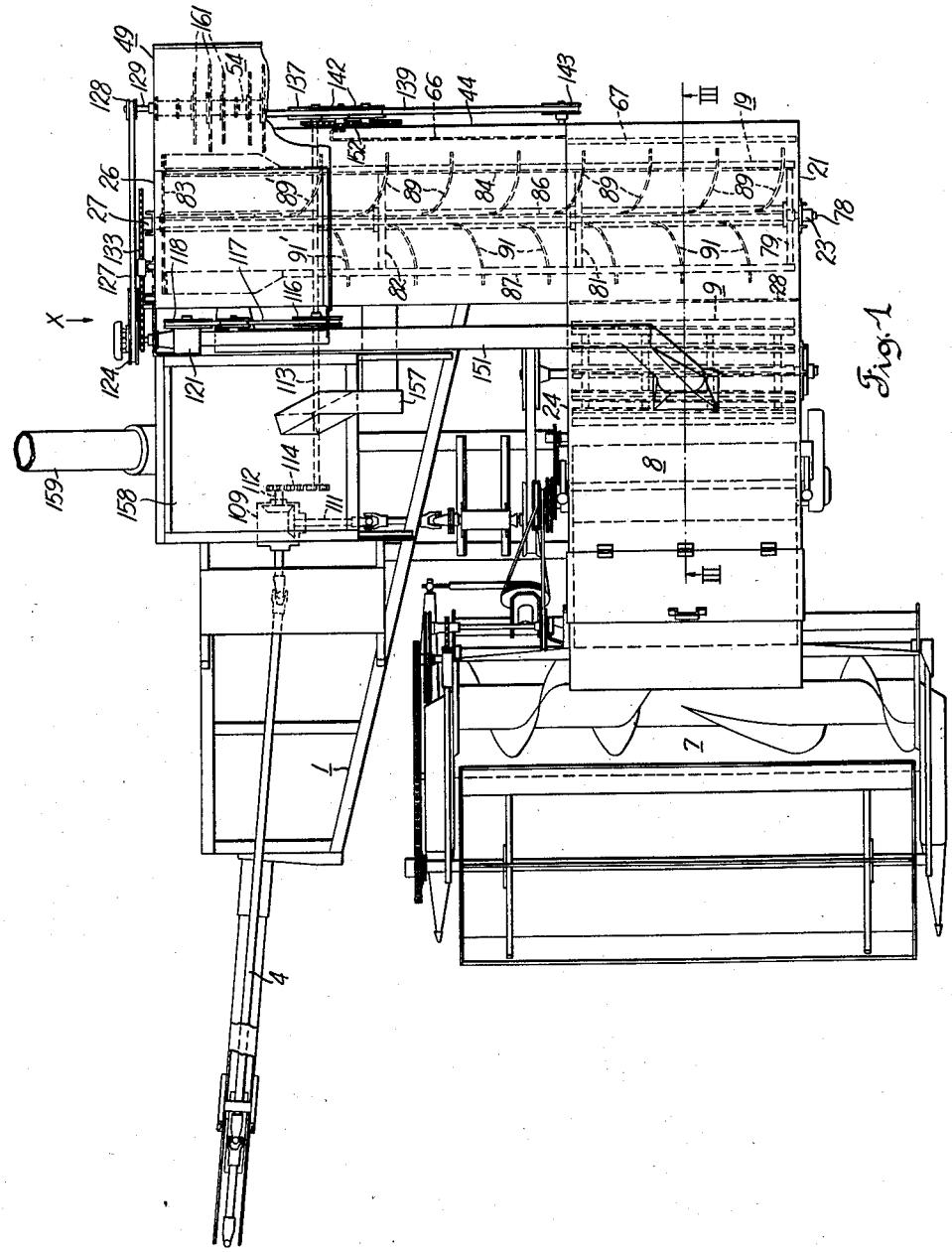
Inventors
Charles J. Scranton
Robert L. Worrell
by
Attorney

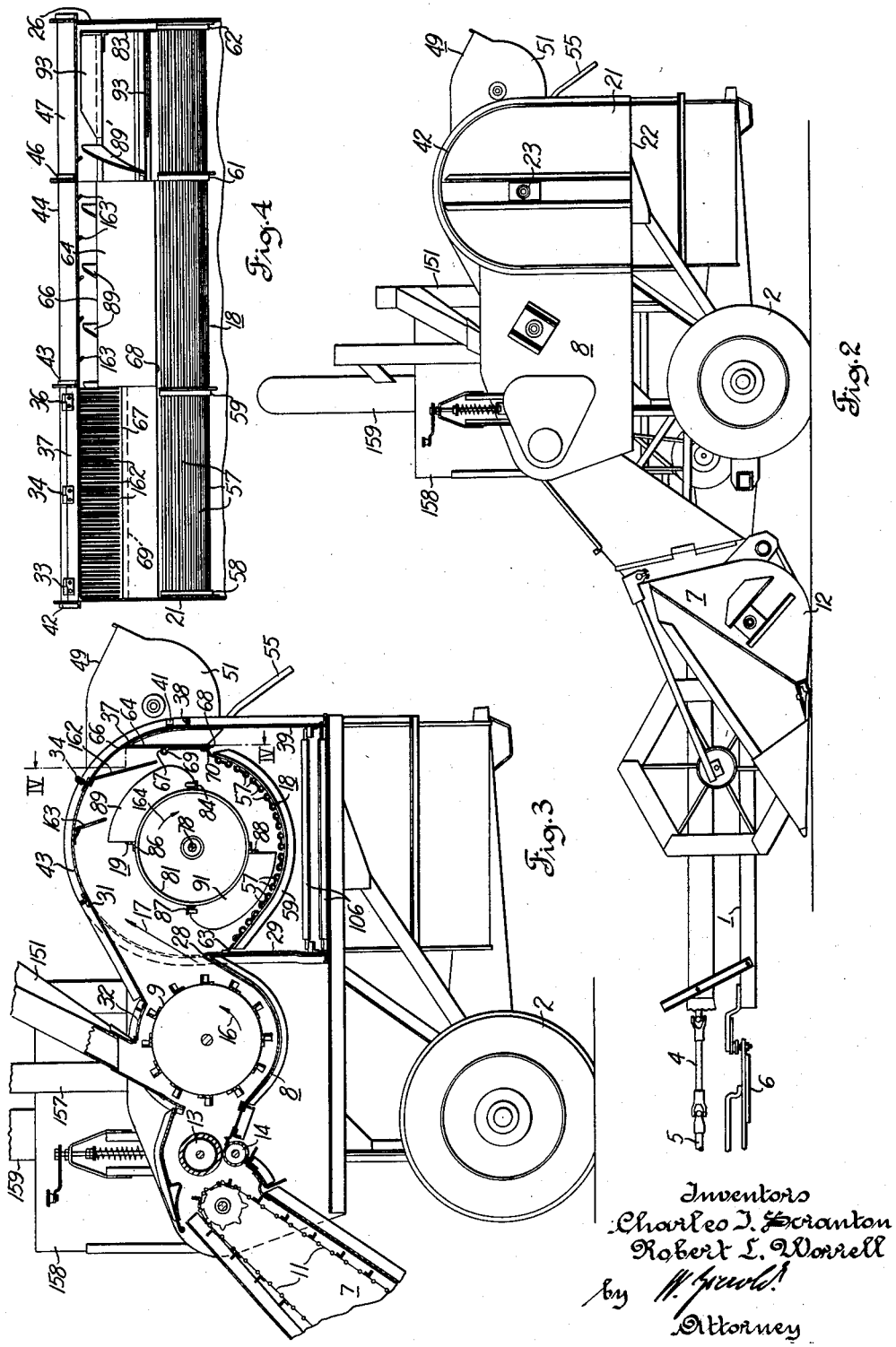

March 8, 1960 C. J. SCRANTON ET AL 2,927,694
ROTARY SEPARATOR FOR HARVESTER THRESHERS
Filed May 31, 1957 5 Sheets-Sheet 4
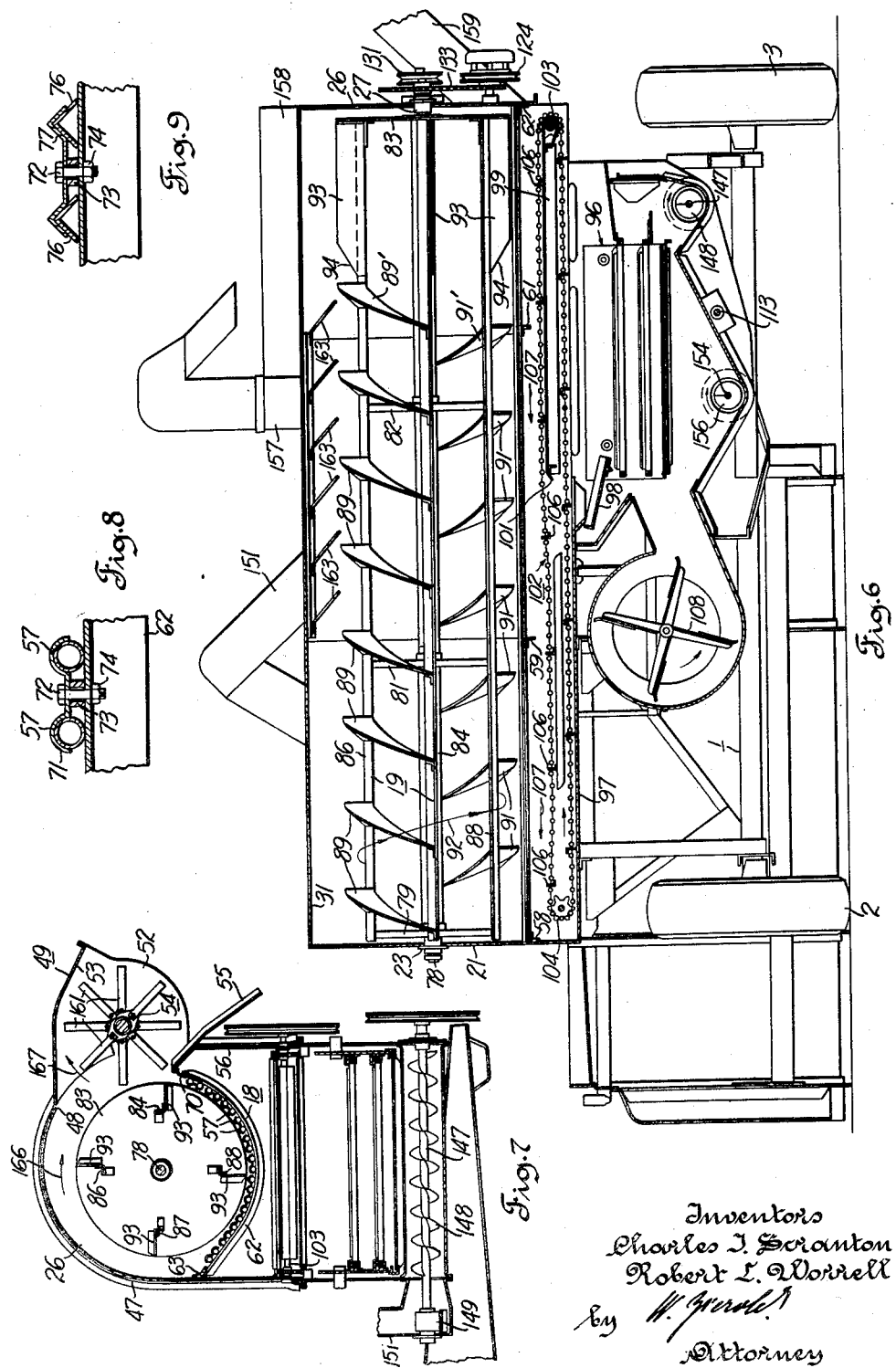
Inventors
Charles J. Scranton
Robert L. Worrell
by
Attorney March 8, 1960 C. J. SCRANTON ET AL 2,927,694
ROTARY SEPARATOR FOR HARVESTER THRESHERS
Filed May 31, 1957 5 Sheets-Sheet 5

Inventors
Charles J. Scranton
Robert L. Worrell

Attorney

United States Patent Office 2,927,694
Patented Mar. 8, 1960

2,927,694

ROTARY SEPARATOR FOR HARVESTER THRESHERS

Charles J. Scranton and Robert L. Worrell, La Porte, Ind., assignors to Allis-Chalmers Manufacturing Company, Milwaukee, Wis.

Application May 31, 1957, Serial No. 662,898

5 Claims. (Cl. 209—283)

The invention relates to harvesting and similar machines wherein a kernel containing mass of crop material is treated so as to separate the kernels from the rest of the mass. More particularly, the invention is concerned with a machine of the mentioned character which is equipped with a separator mechanism of improved construction and mode of operation.

Conventional separating mechanisms for harvester threshers which employ a reciprocating straw rack or a number of reciprocating straw walkers are known to consume an appreciable amount of power. Also, these mechanisms determine to a large extent the overall capacity of the machine, because the maximum amount of material which can be fed to the threshing mechanism is limited primarily by the maximum amount of material which can be handled properly, that is without undue loss of grain, by the separating mechanism.

Attempts have been made during the past to provide a separating mechanism suitable for use in harvester threshers which is more efficient and requires less power than those of the well known and commonly used reciprocating straw rack or straw walker type. For instance, it has been suggested to employ a rotary rather than a reciprocating type of separator, in which the material is advanced by means of a continuously revolving spiral or auger, and in which a perforated concave or grate is arranged under the auger through which the grain may pass as the straw is advanced over the grate by the auger. However, the use of such a rotary separator mechanism in a harvester thresher presents a number of difficulties which are believed to have not been taken care of in a practical and satisfactory manner by heretofore suggested constructions. One of such difficulties is the undue loss of grain which may be incurred if the straw is permitted to move out of the separator housing in the axial direction of the auger. Another difficulty is the congestion of straw within the separator housing which may result if the straw is to be crowded out of the housing by the auger, and particularly through a side opening in a direction at right angles to the axis of the auger. If, as has been suggested, movement of the straw through such a side opening is to be assisted by a fan which induces an air current through the separator housing, complications are apt to result due to an undesirable passage of air through the concave openings and due to grain being blown out of the housing along with the straw.

In actual practice, the volume of material which passes from the threshing mechanism into the separator while the machine advances in the field is at times much larger than at others, due to variations of the terrain and varying growth conditions of the crop being harvested. Rotary separators as heretofore suggested have not been entirely successful to keep the threshed material moving through the separator housing at a desired rate of speed commensurate with the high potential separating ability of such a mechanism and without clogging due to temporary conditions of high volume discharge from the threshing mechanism.

Generally, it is an object of the present invention to provide an improved rotary type separating mechanism for harvester threshers which requires relatively little power, which is highly efficient and which avoids the hereinabove mentioned shortcomings of the prior art.

More specifically, it is an object of the invention to provide a rotary separator mechanism of the hereinabove outlined character wherein movement of the material through the separator housing is effected by the combined action of an auger and a auxiliary mechanical rather than pneumatic straw impelling device.

A still further object of the invention is to provide an improved rotary separator of the hereinabove outlined character which operates to discharge the straw in somewhat chopped condition and to distribute it over a relatively large ground area.

In the drawings:

Fig. 1 is a top view of a harvester thresher, portions at the rear and side of the machine being broken away;

Fig. 2 is a side view of the harvester thresher shown in Fig. 1;

Fig. 3 is an enlarged, partial section on line III—III of Fig. 1;

Fig. 4 is a section, at a reduced scale, on line IV—IV of Fig. 3;

Fig. 6 is a view similar to Fig. 5 exposing mechanism which is hidden by wall portions shown in Fig. 5 and omitted in Fig. 6;

Fig. 7 is a section on line VII—VII of Fig. 5;

Fig. 8 is an enlarged detail view of part of the mechanism shown in Fig. 7;

Fig. 9 is a view similar to Fig. 8 but showing a modified construction;

Figure 5:
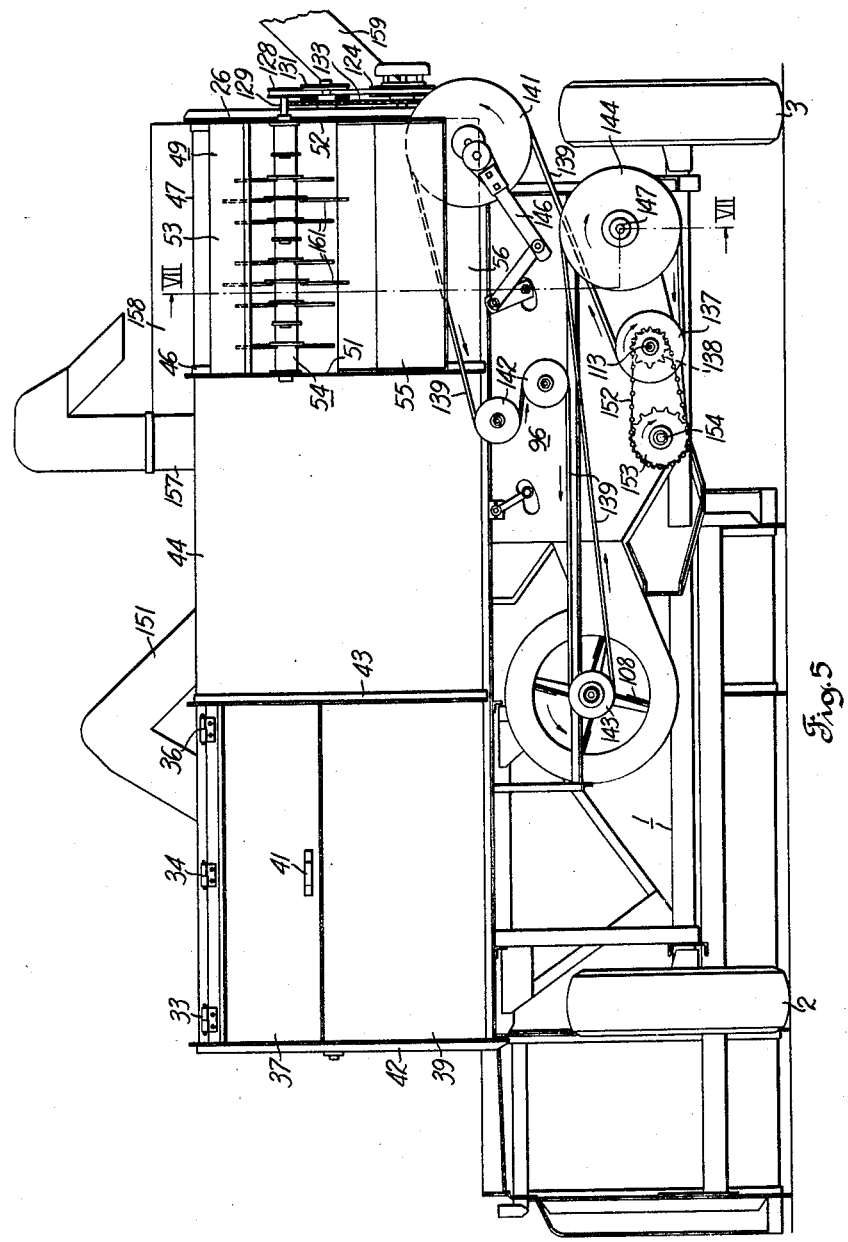
Fig. 5 is an enlarged rear view of the machine shown in Figs. 1 and 2.

Tractor operated harvester threshers are customarily constructed in the form of a semitrailer and supplied with power from a power take-off shaft of the tractor. The harvester thresher shown in Figs. 1 and 2 conforms with these general principles of construction and operation. Its main frame is generally indicated by the reference character 1, its ground wheels by 2 and 3 (Fig. 5), and its power line by the reference character 4, the forward end of the power line 4 being connected to a tractor power take-off shaft 5 as shown in Fig. 2. The front end of the frame 1 is hitched in conventional manner to a tractor drawbar 6.

A header 7 and a threshing mechanism 8 of conventional construction are supported on the main frame 1 in conformity with established practice. As shown in Fig. 1, the header 7 has an effective width considerably greater than the effective width of the threshing cylinder 9 so that a relatively large amount of crop material may be delivered to the threshing mechanism.

Referring to Fig. 3, a feeder raddle 11 carries the cut crop from the header pan 12 (Fig. 2) rearwardly and upwardly to a pair of feed rollers 13 and 14, and by means of these rollers the cut crop is compressed and delivered to the threshing mechanism 8. The threshing cylinder 9 is rotated at the usual, relatively high speed in the direction indicated by the arrow 16, and the arrow 17 indicates the general direction in which the threshed material leaves the threshing mechanism. The mixture of straw, grain, heads and chaff which emerges at high velocity from the threshing mechanism 8 in the direction of arrow 17 passes directly into a rotary separator mechanism which is constructed in accordance with the present invention as explained in detail hereinbelow.

A sheet metal structure which is mounted on the frame 1 provides two principal compartments or housings, one which encloses the threshing mechanism 8 at the left side of the machine, and one which encloses a perforated, kernel emitting concave or grate structure 18 and a rotor 19 of the separating mechanism at the rear of the machine. The term left is used herein as by a person facing the machine from the rear, and the term right will be used similarly hereinbelow.

A vertical, longitudinally extending side sheet 21 (Fig. 2) at the left side of the machine has a forward part which forms the left end wall of the thresher housing, and a rearward portion of the side sheet 21 forms the left end wall of the separator housing. The side sheet 21 has a horizontal bottom edge 22, and mounts a bearing 23 for the left end of the rotor 19 at a substantial vertical spacing from the bottom edge 22.

Figure 10:
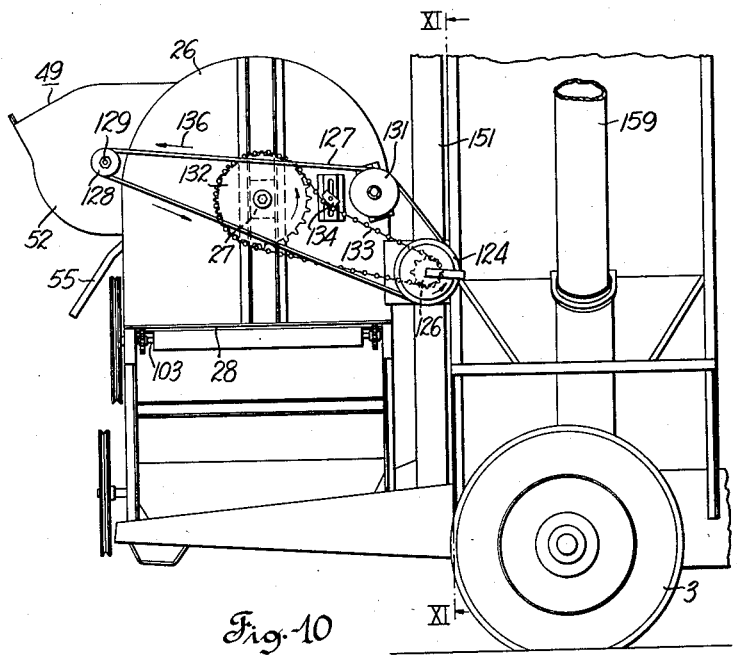
Fig. 10 is an enlarged side view of the rear part of the machine shown in Fig. 1, the view of Fig. 10 being taken in the direction of arrow X in Fig. 1.

Referring to Fig. 1, a side sheet 24 which forms the right end wall of the thresher housing is spaced transversely from the side sheet 21 a distance substantially equal to the width of the threshing cylinder 9, and another side sheet 26 which forms the right end wall of the separator housing is spaced transversely from the side sheet 21 a distance about three times the width of the threshing cylinder 9. As shown in Figs. 6 and 10, the right end wall 26 of the separator housing mounts a bearing 27 for the right end of the rotor 19 in horizontal alignment with the bearing 23. A straight horizontal bottom edge 28 of the end wall 26 is spaced from the axis of the bearing 27 a vertical distance shorter than the vertical spacing of the bottom edge 22 (Fig. 2) of the side sheet 21 from the axis of bearing 23. Each end wall 21 and 26 of the separator housing has an arcuate top edge concentric with the axis of the rotor 19, as shown in Figs. 2 and 10, respectively.

Extending lengthwise of the separator housing between the end walls 21 and 26 is a circumferential wall structure which generally surrounds the grate and rotor assembly 18 and 19, and which is apertured at its front, rear and bottom sides, respectively, to provide a material inlet opening at the left end of the separator housing, a straw discharge aperture at its right end, and a grain outlet passage at its bottom. The material inlet opening of the separator housing is shown in Fig. 3 between the upper edge 28 of a vertical front wall portion 29 and the underside of a fore and aft extending roof section 31. The edge 28 extends parallel to the axes of the threshing cylinder 9 and rotor 19 from the inner surface of the side sheet 21 to the vertical plane of the side sheet 24 of the thresher housing, as shown in Fig. 1. The width of the roof section 31 in the longitudinal direction of the separator housing, that is in the axial direction of the rotor 19, is equal to the spacing between the side sheets 21 and 24.

As shown in Fig. 3, a straight forward portion of the roof section 31 is connected at its forward end to an arcuate top wall 32 of the thresher housing and extends upwardly and rearwardly therefrom across the space between the threshing cylinder 9 and the rotor 19. A rearward portion of the roof section 31 is curved concentrically with the rotor 19 and spaced an appreciable radial distance from the upper side of the latter so that material moving in the direction of arrow 17 will be deflected circumferentially of the rotor in a rearward direction upon engagement with the roof section 31.

Mounted along the rear edge of the roof section 31 are three axially aligned hinges 33, 34 and 36 (Fig. 5) by means of which a curved door 37 is connected to the roof section 31. The width of the door 37 in the longitudinal direction of the separator housing is the same as the width of the roof section 31, and the height of the door corresponds to the circumferential spacing between the horizontal rear edge of the roof section 31 and the horizontal top edge 38 of a vertical rear wall section 39 of the separator housing. In the closed position of the door 37 as shown in Fig. 3, its curvature is concentric with the rotor 19 and its radial spacing from the latter is about the same as the radial spacing between the rotor and the curved rear portion of the roof section 31. A handle 41 (Fig. 5) is attached to the outside of the door 37 so that the latter may be swung outwardly and upwardly about the axis of the hinges 33, 34 and 36, and access may thereby be obtained to the interior of the separator housing at the left end of the latter.

Fig. 2 shows an arched end flange 42 in the form of an inverted U which is secured to the left end wall 21 of the separator housing. A similar arched flange 43 is shown in Fig. 3, and as shown in Fig. 5, the spacing of the flange 43 from the flange 42 in the longitudinal direction of the separator housing corresponds to the width of the door 37 and rear wall 39. Connected to the flange 43 and extending therefrom toward the right side of the machine is a midsection 44 of the separator housing the midsection 44 presenting an arched circumferential closing wall of generally the same U-shape as the flange 43.

Figure 11:
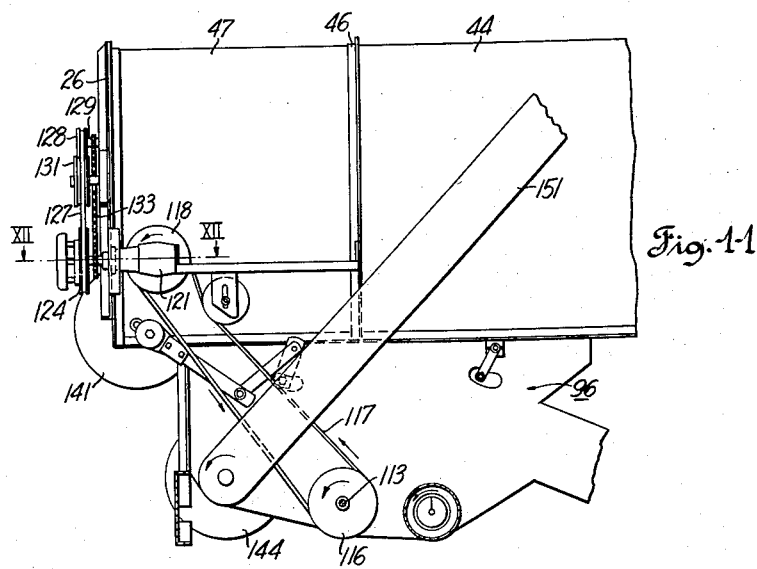
Fig. 11 is an elevational view, partly in section, on line XI—XI of Fig. 10.

A third arched flange 46 of substantially the same shape as the first and second arched flanges 42 and 43 is connected to the right end of the midsection 44 as shown in Figs. 5 and 11. The width of the midsection 44 in the longitudinal direction of the separator housing is such that the flange 46 and the right end wall 26 are spaced a substantial transverse distance from each other.

At the forward and upper part of the separator housing, the space between the flange 46 and the end wall 26 is closed by a wall section 47 which, as shown in Fig. 7, has a vertical, straight lower part and an arcuate upper part generally concentric with and radially spaced from the rotor 19. The arcuate upper part of the wall section 47 has a horizontal rear edge 48 which extends across the space between the flange 46 and the end wall 26, and a straw hood 49 which forms part of the separator housing extends rearwardly from the edge 48 of the wall section 47.

The straw hood 49 comprises a pair of parallel, left and right side walls 51 (Fig. 2) and 52 (Fig. 7) which are connected to and extend rearwardly from the arched flange 46 (Fig. 5) and end wall 26, respectively. The side walls 51 and 52 are connected together by a top wall 53 which has a straight horizontal forward portion and a rearwardly and downwardly inclined rear portion, the straight forward portion of the straw hood top wall 53 being connected to the wall section 47 along the edge 48. Mounted within the straw hood 49 is a rotary beater 54 which performs the double function of stripping straw from the rotor 19 and ejecting it from the separator housing as will be explained more fully hereinbelow.

Below the straw hood 49, an apron 55 and a vertical wall portion 56 extend between the end wall 26 and the rear leg of the arched flange 46. The top surface of the apron 55, the side walls 51 and 52 of the straw hood, and the bottom surface of the hood top wall 53 define a side aperture of the separator housing at the right end of the latter, and the beater 54 is operatively mounted to extend axially across said side aperture in the axial direction of the rotor 19.

The concave or grate structure 18 which, as stated, is mounted within the separator housing comprises a series of grate bars 57 which are supported in spaced, side by side relation on four curved angle iron girders 58, 59, 61 and 62, as indicated by Figs. 3 and 4.

Referring to Fig. 3, the girder 59 is supported at its forward end by a ledge strip 63 which is secured to the vertical front wall portion of the separator housing. The rear end of the girder 59 is connected to the lower edge of a vertical partition 64 within the midsection 44 of the separator housing.

Referring to Fig. 4, the partition 64 has a top edge 66 which is equal in length to the width of the midsection 44, and another top edge 67 which is equal in length to the spacing between the arched angle iron flanges 42 and 43. At its lower end, the partition 64 has a straight horizontal bottom 68 which extends from the left end wall 21 toward the right end wall 26 of the separator housing but terminates at a distance from the latter substantially equal to the width of the straw hood 49. The high part of the partition 64, that is the part which is located within the midsection 44 of the separator housing, is secured along its top edge 66 to the inner side of the mid-section 44 so as to extend in a vertical plane at an appreciable forward distance from the plane of the vertical rear wall portion 39 of the separator housing and in rear of the rotor 19. The low part of the partition 64 which has the top edge 67, extends in the same vertical plane as the high part, and a plate having a beaded top edge 69 is secured face to face to the low part of the partition at the forward side of the latter and extends vertically in the space between the rotor 19 and rearward wall portions of the separator housing afforded by the door 37 and the vertical rear wall section 39.

The curved angle iron girder 61 shown in Fig. 4 is mounted within the separator housing in the same manner as explained hereinbefore with reference to the girder 59 (Fig. 3), and the end girders 58 and 62 (Fig. 4) are suitably secured to the end walls 21 and 26, respectively, of the separator housing.

The grate bars 57 as shown in Figs. 3 and 8 are of round, tubular section and, as shown in Fig. 4, their length corresponds to the inside spacing between the end walls 21 and 26 of the separator housing. The bars 57 are secured in pairs to each of the girders 58, 59, 61 and 62, and they are spaced uniformly from each other circumferentially of the rotor 19. The space between the front wall of the separator housing and the grate bar 57 next to it is closed by the ledge strip 63 throughout the length of the separator housing, and another ledge strip 70 along the rear edge of the grate structure extends the full length of the separator housing from the left end wall 21 to the right end wall 26 and is secured to the rear ends of the girders 58, 59, 61 and 62. The ledge strip 70 is also secured to the partition 64 along the bottom edge 68 of the latter and to the forward end of the apron 55 as shown in Fig. 7. The gap between the ledge strip 70 and the rear wall 56 of the separator housing, at the right end of the latter, is closed by the apron 55 whose length axially of the rotor 19 corresponds to the spacing between the side walls 51 and 52 of the straw hood 49. The junction between the ledge strip 70 and the apron 55 defines a longitudinally extending side edge of the concave 18 in raised relation to the bottom part of the latter.

An enlarged view of the connection between relatively adjacent bars 57 and the underlying girder 62 is shown in Fig. 8. The spacing between the bars 57 as shown in Fig. 8 is determined by a retainer clip 71 which has a straight center portion and half round opposite end portions whose inside radii correspond to the outside radii of the underlying bars 57. The half round end portions of the clip 71 straddle the adjacent bars 57, and in order to secure the bars in place a bolt 72 is passed through the center portion of the clip 71 and through a registering hole in the laterally extending flange of the underlying girder 62. A spacer 73 surrounds the bolt 72 in the space between the clip 71 and the underlying flange of the girder 62, and a nut 74 on the bolt 72 is drawn up tight so as to firmly engage the clip with the rods and the rods with the girder. The foregoing explanations with respect to Fig. 8 apply to the connections between all the grate bars 57 and the underlying girders 58, 59, 61 and 62, respectively. The spaces between relatively adjacent grate bars provide grain emitting apertures of the grate structure through which loose grain, unthreshed heads and chaff may pass into the lower part of the separator housing.

Fig. 9 shows a modified grate construction wherein the grate bars 76 are of angular cross section rather than of the tubular cross section as shown in Fig. 8. A retainer clip 77 is placed across the pair of relatively adjacent grate bars 76, and the parts are secured in assembled condition by means of a bolt, spacer and nut corresponding to those shown in Fig. 8.

Referring to Figs. 6 and 7, the rotor 19 comprises a central shaft 78 which is journaled in the bearings 23 and 27. Three peripherally flanged disks 79, 81 and 82 are rigidly mounted on axially spaced portions of the shaft 78, and a fourth disk 83 of substantially larger diameter than the disks 79, 81 and 82 is rigidly mounted on the shaft 87 next to the end wall 26.

A circumferential series of angle bars 84, 86, 87 and 88 are mounted at peripherally equal spacings from each other on the disks 79, 81, 82 and 83 and extend substantially the full length of the space between the left end wall 21 and the end disk 83. Rigidly mounted on the angle bars 84 and 86 is a longitudinal series of helical conveyor flights 89, each flight having a leading end portion secured to the bar 84 and a trailing end portion secured to the bar 86. The flights 89 are equally pitched and equally distributed lengthwise of the rotor 19 in the part of the separator housing which extends between the left end wall 21 and the straw discharge aperture at the right end of the separator housing. As shown in Fig. 6 the right end flight 89' is spaced a substantial axial distance from the right end wall 26 of the separator housing, and from Fig. 1 it will be noted that the axial length of the straw hood 54 is somewhat greater than the spacing of the end flight 89' from the end wall 26. Another longitudinal series of helical conveyor flights 91 are mounted on the angle bars 87 and 88, each flight 91 having a leading end portion secured to the bar 87 and a trailing end portion secured to the bar 88. The pitch and relative spacing of the helical flights 91 are the same as the pitch and relative spacing of the helical flights 89. However, the helical flights 91 are offset one half pitch with respect to the helical flights 89, and the right end flight 91' is spaced from the right end wall 26 of the conveyor housing a distance substantially equal to the axial length of the straw hood 49.

The arrow 92 in Fig. 6 indicates the direction in which the rotor 19 is normally rotated during operation of the machine. The threshing cylinder 9 discharges the threshed material into the separator housing at the left end of the latter, and the helix angle of the conveyor flights 89 and 91 is such that rotation of the rotor in the direction of arrow 92 imparts rotary and axial advance movement to the kernel containing crop material from the left end towards the right end of the separator housing.

At the right end of the rotor 19 as shown in Figs. 6 and 7, a circumferential series of radial paddle members 93 are secured to the angle bars 84, 86, 87 and 88, respectively. The paddle members 93 are identically shaped, and each has a radial edge at its right end and a tapered edge 94 at its left end. Referring to the paddle member 93 which, as shown in Fig. 6, extends radially outward from the angle bar 86, the radial height of said paddle member corresponds to the radial height of the conveyer flights 89, and at its right end the paddle member 93 abuts the end disk 83 to which it is suitably secured. At the left end of the paddle member 93, the tapered edge 94 gradually reduces its radial height in a direction toward the series of conveyer flights 89. The other paddle members 93 which extend radially outward from the angle bars 84, 87 and 88, respectively, are secured at their right ends to the end disk 83 in the same manner as the paddle member 93 which extends from the angle bar 86.

A grain cleaning shoe 96 of generally conventional construction is shown in Fig. 6 below the separator mechanism at the right side of the machine. A bottom wall 97 of the separator housing extends horizontally from the end wall 21 and terminates at its right end above an inclined tray 98 leading into the shoe 96. A horizontal baffle 99 is mounted between the depending front and rear wall portions of the separator housing and has a downwardly inclined lip 101 at its left end above the tray 98 and at a transverse spacing from the right end of the bottom wall 97. The baffle 99 extends horizontally between the front and rear walls of the separator housing and terminates at its right end in proximity to the right end of the latter.

Loose grain, unthreshed heads, chaff and short pieces of straw which fall through the grain emitting apertures of the grate structure 57 are intercepted by the bottom wall 97 and by the partition 99. A grain drag or rake 102 of conventional construction is mounted within the separator housing below the grate structure 57. The grain drag 102 includes a pair of endless chains, one adjacent to the front wall and the other adjacent to the rear wall of the separator housing, which pass over driving sprockets on a drive shaft 103 at the right end of the separator housing, and over idler sprockets 104 at the left end of the separator housing. Transverse raking bars 106 which extend between and connect the chains of the grain drag, bear upon the bottom wall 97 of the separator housing and upon the baffle 99. The normal direction of movement of the grain drag is shown by the arrow 107. Material accumulating on the bottom wall 97 will be swept by the lower run of the grain drag towards the right and into the shoe 96, while material accumulated on the baffle 99 will be swept by the upper run of the grain drag towards the left and into the shoe 96.

Cleaning air for the shoe 96 is supplied by a fan 108 in a conventional manner. The baffle 99 which is interposed between the grate structure 57 and the shoe 96 serves the additional purpose of substantially shielding the grate structure from the air which is delivered by the fan 108.

Figure 12:
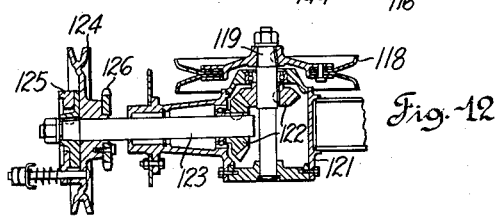
Fig. 12 is an enlarged section on line XII—XII of Fig. 11.

Referring to Fig. 1, the power line 4, which as stated is connected to a power take-off shaft 5, leads into a gear box 109 which is mounted on the main frame 1 of the harvester thresher. The gear box 109 has a power outlet shaft 111 for supplying driving power to the various parts of the header 7 and of the thresher mechanism 8 in a conventional manner. A second power outlet shaft 112 of the gear box 109 extends rearwardly from the latter and serves to supply driving power to the rotor 19, the beater 54 and other parts of the machine including the shoe 96, and fan 108. A counter shaft 113 is spaced transversely from the power outlet shaft 112, and a chain 114 engages a driving sprocket (not shown) on the rear end of the shaft 112 and a driven sprocket (not shown) on the front end of the counter shaft 113 for transmitting driving power from the shaft 112 to the counter shaft 113 for rotating the latter in the same direction as the power line 4. Referring to Fig. 11, the counter shaft 113 mounts a V-belt sheave 116 at the forward side of the shoe 96, and a V-belt 117 connects the sheave 116 in driving relation with a V-belt sheave 118 at the forward side of the separator housing wall 47. As shown in Fig. 12, the sheave 118 is secured to a shaft 119 which is mounted in a bevel gear housing 121, and as shown in Figs. 10 and 11, the bevel gear housing 121 is mounted at the forward side of the separator housing. The shaft 119 has a driving connection within the housing 121 by means of a pair of bevel gears 122 with a shaft 123 which extends outwardly from the gear box 121 in a horizontal direction beyond the right end wall 26 of the separator housing. A V-belt sheave 124 and a sprocket wheel 126 are mounted on the outer end of the shaft 123 and are rotatable by the latter in unison with each other, a slip clutch 125 of conventional construction being operatively interposed between the shaft 123 and the sheave and sprocket cluster 124, 126.

A V-belt 127 connects the sheave 124 in driving relation with a V-belt pulley 128 on the shaft 129 (Fig. 1) of the beater 54. A tensioning idler 131 for the V-belt 127 is adjustably mounted on the right end wall 26 of the separator housing.

The sprocket wheel 126 on the shaft 122 drives a sprocket wheel 132 (Fig. 10) on the right end of the rotor shaft 78 by means of a chain 133. A tensioning block 134 for the chain 133 is adjustably mounted on the right end wall 26 of the separator housing. The arrow 136 (Fig. 10) indicates the direction in which the sheave 124 and sprocket wheel 126 are rotated during normal operation of the machine. It will be noted that the rotor 19 will be driven in the same direction as, but at a slower speed than the sprocket wheel 126, and that the shaft 129 of the beater 54 will be driven in the same direction as the rotor 19 but at a much higher speed.

Referring again to Fig. 1, the counter shaft 113 extends through the shoe 96 and, as shown in Fig. 5, a V-belt sheave 137 and a sprocket wheel 138 are mounted on the shaft 113 at the rear end of the latter for rotation in unison herewith. An endless V-belt 139 passes from the sheaves 137 around a sheave 141, then around two idler pulleys 142 to a driving pulley 143 for the fan 108, and then around a sheave 144 and back to sheave 137. The sheave 141 is secured to a shaft which has a crank and pitman connection 146 with a conventional shaking mechanism of the shoe 96, and the sheave 144 is secured to a shaft 147, which as shown in Fig. 7, mounts a tailings conveying auger 148. The shaft 147 also drives a tailings elevating conveyor 149 as shown in Fig. 7. The tailings elevating conveyor is enclosed in a chute 151 (Fig. 6) which communicates in material delivering relation with the threshing mechanism 8 (Fig. 3).

Referring to Fig. 5, a chain 152 connects the sprocket wheel 138 with a sprocket wheel 153 at the rear end of a clean grain auger shaft 154. As shown in Fig. 6, the shaft 154 mounts an auger flighting 156 in a well at the bottom of the shoe 96, and a clean grain elevating conveyer (not shown) is enclosed in a vertical chute 157 which has a lower end in material receiving relation to the clean grain auger 156 and an upper end in material delivering relation to a grain bin 158. As shown in Figs. 1 and 2, the grain bin 158 is mounted on the main frame 1 of the machine in front of the separator housing and at the right side of the thresher mechanism 8. A conventional unloading mechanism for the grain bin 158 includes an elevator pipe 159 partly shown in Figs. 1, 2 and 10.

The beater 54 which, as stated, is mounted in the straw hood 49 comprises the mentioned shaft 129 which is journaled by means of suitable bearings in the side walls 51 and 52 of the straw hood 49. The shaft 129 extends parallel to the axis of the rotor 19 and across the side aperture of the separator housing which is defined by the top and side walls of the straw hood 49 and by the apron 55 at the right end of the separator housing. The shaft 129 is radially offset from the circular path of movement of the paddle members 93, and a series of flail members 161 are mounted on the shaft 129 in circumferentially and axially spaced relation to each other. The flails 161 are pivotally mounted on the shaft 129 for swinging movement in axially spaced vertical planes at right angles to the shaft 129. Features of the herein disclosed beater arrangement are claimed in U.S. Patent 2,740,247, dated April 3, 1956, R. L. Worrell, Straw Spreader for Combines.

As shown in Figs. 3 and 4, a comb structure 162 comprises a series of parallel, relatively spaced straight wires which are rigidly secured at their upper ends to an upper part of the door 37. The length of wires and their mounting on the door 37 are such that when the door is closed as shown in Fig. 3, the free ends of the wires are spaced from the beaded edge 69 in a forward and upward direction and so that the wires are cleared by the revolving flights 89 and 91 of the rotor 19. The length of the comb structure 162 axially of the rotor 19 corresponds to the length of the door 37. The spacing between the wires of the comb structure is such that grain may pass therethrough in operation of the machine as will be explained more fully hereinbelow.

Fixedly mounted within the upper part of the midsection 44 of the separator housing is a row of stiff wire prongs 163 (Fig. 6). These prongs are downwardly and laterally inclined toward the right end of the separator housing, and as shown in Fig. 3, they are also slightly inclined rearwardly and terminate at a radial spacing from the axis of shaft 78 somewhat greater than the peripheral edge radius of the conveyer flights 89 and 91.

In operation, the rotor 19 is rotated in the direction of arrows 92 and 164 shown in Figs. 3 and 6 at a suitable speed to cause rotary movement of the conveyer flights 89, 91 and of the paddle members 93 at a substantial circumferential velocity. Threshed material enters the separator housing in a state of turbulence along the roof section 31 and it is thrown over the rotor 19 against the comb structure 162 which is the full width of the threshing cylinder 9. The crop material then drops down into the rotor 19 and begins its motion endward over the grate structure while a certain percentage of the threshed grain is thrown through the comb structure 162 and falls through the space between the partition 64 and the rear wall 39 of the separator housing into the lower part of the latter.

The conveyer flights 89 and 91 intermittently impart rotary and axial advance movement to kernel containing crop material above the grate in the direction from the left toward the right end of the latter, and due to the circumferential and axial spacing of the conveyer flights 89 from the conveyer flights 91 the material above the grate is thoroughly agitated during its endwise movement within the separator housing.

The feeding action of the conveyer flights 89 and 91 causes endwise movement of the material into the circumferential spaces between the radial paddle members 93, and the material will tend to accumulate within these spaces. Such accumulation, however, is controlled by the beater 54 which operates to continuously withdraw approximately the same amount of straw from the spaces between the paddle members 93 as is fed into these spaces by the conveyer flights 89 and 91. The arrows 166 and 167 in Fig. 7 indicate the directions in which the rotor 19 and the beater 54 rotate, and the relative proportioning of the paddle members 93 and of the flail members 161 is such that the flails will engage the straw which is revolved by the paddle members 93 within the separator housing and eject it therefrom through the straw hood 49. In other words, the rotary beater 54 has an operating radius of such length that rotation of the beater on its axis will cause it to engage the residual crop material which is revolved within the right hand end portion of the separator housing, and to eject such material from the separator housing through the side aperture of the latter above the junction between the concave ledge strip 70 and the apron 55.

As the mixture of straw, unthreshed heads, loose grain and chaff is moved by the rotor 19 over the grate structure, the loose grain along with the unthreshed heads and some of the chaff will pass through the spaces between the grate bars 57 or 76, and into the lower part of the separator housing. Separation of the grain and unthreshed heads from the straw takes place not only through the portion of the grate which extends below the conveyer flights 89 and 91, but it also takes place through the portion of the grate which extends below the paddle members 93. Undue compacting of the material which is fed by the conveyer flights 89, 91 into the spaces between the paddle members 93 is prevented by the action of the beater 54, and loose grain and unthreshed heads which may be fed along with the straw into the spaces between the paddle members 93 may readily pass through the spaces between the grate bars at the right end of the separator housing, while the straw is carried around by the paddle members 93 and before it is ejected by the beater 54. Accordingly, the grate structure is utilized for separation substantially throughout its entire length from one end of the separator housing to the other.

The wire prongs 163 (Fig. 6) in the midsection 44 of the separator housing counteract any tendency of the threshed material to conglomerate during its movement toward the discharge end of the separator housing, particularly at times when the machine passes through areas of abnormally heavy growth and becomes temporarily overloaded. The prongs 163 are inclined toward the right end of the separator housing in order to facilitate movement of the straw toward said end.

The rotor 19 revolves continuously in one direction, and it requires considerably less driving power than a conventional separating mechanism of equal capacity which utilizes a reciprocating straw rack or straw walkers. The length of the separator housing in the axial direction of the rotor 19 is relatively short, and the entire separating mechanism is much more compact and requires less space than a separating mechanism of the conventional reciprocating straw rack or straw walker type of equal capacity.

The grain and chaff which pass through the comb structure 162, and the grain, unthreshed heads and chaff which fall through the spaces between the grate bars 57 or 76 are moved by the grain drag 102 upon the tray 98 which forms part of the shoe 96. Within the shoe separation of the grain from the unthreshed heads and removal of the chaff are effected in accordance with well known principles. The cleaning air which is delivered by the fan 108 into the shoe moves through the latter toward the chaff outlet at the right end of the shoe, and the baffle 99 which is mounted in the lower part of the separator housing substantially shields the grate structure within the separator housing from the cleaning air.

The beater shaft 129 is driven at a substantially higher speed than the rotor shaft 78, and the flails 161 not only function to withdraw straw from the spaces between the paddle members 93 but they also function to chop up the straw somewhat and to distribute it over a relatively large area in rear of the machine.

While in the foregoing a preferred embodiment of the invention has been explained, it should be understood that it is not intended to limit the invention to the exact forms and details herein described, and that the invention includes such other forms and modifications as are embraced by the scope of the appended claims.

What is claimed is:

1. In a machine of the character set forth, a rotary separator mechanism comprising, in combination, a stationary concave structure having kernel emitting apertures, agitating means operatively mounted for rotation on an axis in overlying relation to said concave structure and comprising auger flighting extending axially from one end of said concave structure and terminating in axially spaced relation to the other end thereof, and a circumferential series of radial paddle members extending axially adjacent said other end of said concave structure, a housing structure enclosing said agitating means and presenting a side aperture at said other end of said concave structure for the discharge of residual crop material from said housing structure in a direction transverse to the axis of said agitating means, a rotary shaft operatively mounted to extend parallel to the axis of said agitating means and across said side aperture in radially offset relationship to said paddle members, and a series of flail members mounted on said shaft in circumferential and axially spaced relation to each other, said paddle members and flail members being relatively proportioned so that said flail members will engage crop material revolved by said paddle members within said housing structure and eject it therefrom through said aperture upon rotation of said agitating means and shaft.

2. The combination set forth in claim 1, and drive means for said agitating means and shaft operable to rotate said shaft at a substantially higher speed than said agitating means.

3. The combination set forth in claim 1, drive means operable to rotate said agitating means at a predetermined speed, and drive means operable to rotate said shaft in the same direction as, and at a substantially higher speed than said agitating means.

4. In a machine of the character set forth, a separator comprising: the combination of a separator housing enclosing a perforated, kernel emitting grate structure of an effective length substantially equal to the spacing between an upright closing wall at one end, and another upright closing wall at the other end of said housing; a circumferential wall structure of said housing extending between said closing walls in overlying relation to said grate structure and presenting a side aperture for the discharge of residual crop material from said housing at said other end of the latter; a rotary agitating and conveying structure of an effective length substantially equal to said effective length of said grate structure operatively mounted above and in cooperative relation with the latter so that crop material delivered to said agitating and conveying structure at said one end of said housing will be spirally advanced toward said other end of said housing, said rotary agitating and conveying structure including radial paddle members at said other end of said housing in material delivering relation to said side aperture and a rotary beater element mounted at said other end of said housing in parallel radially offset, cooperative relation to said blade elements so as to engage residual crop material delivered by said paddle members and expel it from said housing through said aperture.

5. In a machine of the character set forth, a separator mechanism comprising, in combination, a perforated stationary concave structure having a side edge in raised relation to its bottom part, a rotary agitating and conveying structure operatively mounted above and in cooperative relation with said concave structure so that crop material delivered to said agitating and conveying structure at one end of said concave structure will be spirally advanced toward the other end thereof, said rotary agitating and conveying structure including radial paddle members at said other end of said concave structure operative to elevate crop material beyond said side edge upon rotation of said agitating and conveying structure in one direction; a housing structure enclosing said agitating and conveying structure and presenting a side aperture above said side edge at said other end of said concave structure, a rotary beater element operatively mounted at said other end of said concave structure in confronting relation to said side aperture on an axis spaced from and extending generally parallel to the axis of said agitating and conveying structure, and drive means for rotating said beater element in said one direction so that crop material raised by said paddle members above said side edge will be engaged by said beater element and ejected from said housing structure through said side aperture.

References Cited in the file of this patent

UNITED STATES PATENTS

| | | |
|---|---|---|
| 718,902 | Berry | Jan. 20, 1903 |
| 723,670 | Hixson et al. | Mar. 24, 1903 |
| 1,780,481 | Hale | Nov. 4, 1930 |
| 2,686,522 | Dort | Aug. 17, 1954 |
| 2,740,247 | Worrell | Apr. 3, 1956 |
| 2,770,354 | Morrison | Nov. 13, 1956 |